US008922775B2

(12) United States Patent
Kettler et al.

(10) Patent No.: US 8,922,775 B2
(45) Date of Patent: *Dec. 30, 2014

(54) CHECK-TILE FOR COLOUR MEASUREMENT INSTRUMENTS

(75) Inventors: Wilhelm Kettler, Wuppertal (DE); Uwe Johansson, Erkrath (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/990,627

(22) PCT Filed: Dec. 20, 2011

(86) PCT No.: PCT/US2011/066323
§ 371 (c)(1),
(2), (4) Date: May 30, 2013

(87) PCT Pub. No.: WO2012/088200
PCT Pub. Date: Jun. 28, 2012

(65) Prior Publication Data
US 2013/0242306 A1    Sep. 19, 2013

Related U.S. Application Data

(60) Provisional application No. 61/424,801, filed on Dec. 20, 2010.

(51) Int. Cl.
*G01J 3/52* (2006.01)
*G01J 3/02* (2006.01)
*G01J 3/50* (2006.01)

(52) U.S. Cl.
CPC ............ *G01J 3/0205* (2013.01); *G01J 3/50* (2013.01); *G01J 3/504* (2013.01); *G01J 3/52* (2013.01); *G01J 3/524* (2013.01)

USPC .......................................... 356/421

(58) Field of Classification Search
CPC ............ G01N 21/278; G01N 21/274; G01N 21/4785; A61B 2560/022; A61B 5/1495
USPC ............................... 356/243.1, 421
See application file for complete search history.

(56) References Cited

U.S. PATENT DOCUMENTS

| 6,514,568 | B1 * | 2/2003 | Nagano et al. | 427/407.1 |
| 2003/0170400 | A1 * | 9/2003 | Laver et al. | 427/458 |
| 2005/0208319 | A1 * | 9/2005 | Finley et al. | 428/545 |
| 2008/0235224 | A1 * | 9/2008 | Rodrigues et al. | 707/6 |

* cited by examiner

*Primary Examiner* — Tarifur Chowdhury
*Assistant Examiner* — M D Rahman
(74) *Attorney, Agent, or Firm* — Ingrassia Fisher & Lorenz, P.C.

(57) ABSTRACT

The invention relates to a check-tile for validating instrument scales of color measurement instruments, in particular goniospectrophotometers, said check-tile comprising a non-transparent (opaque) substrate coated with a pigmented coating, wherein: A) said non-transparent (opaque) colored substrate is colored with at least one achromatic solid pigment, and is coated with a pigmented mid-coat, wherein said pigmented mid-coat I is translucent and made of a base coat coating composition I comprising at least one transparent interference pigment and at least one transparent or semi-transparent solid colored pigment, or, B) said non-transparent (opaque) colored substrate is colored with at least one opaque solid color pigment, and is coated with a pigmented mid-coat II, wherein said pigmented mid-coat is translucent and made of a base coat coating composition II comprising at least one transparent interference pigment.

18 Claims, 7 Drawing Sheets

CHECK-TILE FOR COLOUR MEASUREMENT INSTRUMENTS

CROSS-REFERENCE TO RELATED APPLICATION

This application is a U.S. National-Stage entry under 35 U.S.C. §371 based on International Application No. PCT/US2011/066323, filed Dec. 20, 2011, which was published under PCT Article 21(2) and which claims the benefit of U.S. Provisional 61/424,801, filed Dec. 20, 2010, which are hereby incorporated by reference in their entirety.

FIELD OF INVENTION

The invention relates to a check-tile for validating instrument scales of colour measurement instruments, specifically of goniospectrophotometers.

BACKGROUND OF INVENTION

Colour measurement instruments used in colour development, pigment testing, or production control must provide the quality and quantity of data required with high reliability, serviceability, and speed of operation, independent of operating environment, and at reasonable cost. In a multi-plant operation, uniformity of testing equipment also becomes an important consideration. Whenever reflectance spectra are stored for use as numerical standards, a program of careful monitoring of the colour measurement instrumentation and of providing preventive maintenance at regular time intervals should be instituted. Without the associated support, a program of maintaining numerical standards will probably produce less than satisfactory results. Hence, a basic requirement of any colour measurement instrument is stability, i.e., it must give the same readings for an identical sample over a period of time.

All instruments consist of various optical and electrical components which all are subject to ageing processes. These ageing processes give rise to a gradual drift of the instrument readings over time. Eventually, the drift of an instrument can be traced back to a deteriorating detector element, to a distorted spectral power distribution of the lamp spectrum, or a shift in colour position of the calibration white tile. As a consequence of instrument drift it might be necessary to send it in to the manufacturer for service. However, when it is returned from recertification service the measured spectra of standards might differ from the previous average values and can not be made to coincide exactly with the gathered historical data. The change in reflectance measurements before and after repair must be considered as a design defect. This defect can be kept negligibly small by means of an efficient instrument profiling technology.

Methods have been devised, for example, in A. R. Robertson, Diagnostic performance evaluation of spectrophotometers, in Advances in Standards and Metrology in Spectrophotometry, ed. by C. Burgess and K. D. Mielenz, p. 277, Elsevier Science Publishers B. V. (1987) for diagnosing the performance of a spectrophotometer with respect to a reference instrument or reference data sets by measuring the spectral reflectance (or transmittance) factors of a set of special samples exhibiting a variety of spectral shapes and features. Different types of errors are separated by matching a composite error model to the experimentally observed spectral differences between sample and reference data sets. Any error whose effect on a particular sample can be expressed as a mathematical function of its spectral reflectance (or transmittance) factor can be included in the analysis.

For a daily quick-check of the performance of a colour measurement system the diagnostic tools described above are too time-consuming and complex for the operators of the equipment. Generally a system specialist will be responsible to thoroughly diagnose and document the performance of measuring instruments in regular intervals as, e.g., every six months. In addition to that process flows in industry require an efficient quick-test allowing the operator to validate the overall performance of instrumentation in possibly a single measurement step with easily interpretable results.

The major factors affecting the performance of colour measuring instruments are stability, photometric scale, wavelength scale or filter-fit, angle scale, and stray light. To define and validate these instrument scales and performance criteria, material standards have to be used. These material standards represent physical systems, whose properties depend on intrinsic variables as, e.g., the ambient temperature. Hence, the above list has to be extended to include as a further performance factor the material standards used.

It is recognised that the capability to make accurate measurements requires more than just the provision of a calibrated white standard. Additional quality assurance methods as, e.g., the provision of performance test samples, instructions for their use, the analysis of the results, diagnosis of any errors and instructions on how to remedy them, and retesting until satisfactory performance is achieved.

The performance of an instrument should be tested directly after it has been calibrated. It is convenient to test several aspects of performance at once. Obviously different material standards must be used for calibration and testing, since an error in standardisation or a defect in the standard could not be detected otherwise.

Repeatability data for each instrument are routinely obtained using a set of dedicated stable coloured material standards as, e.g., the set of BCRA ceramic tiles (BRCA=British Ceramic Research Association). This set comprises 4 achromatic and 8 chromatic tiles. The achromatic (grey) tiles are useful to test photometric linearity, but are not useful to test errors associated with the wavelength scale. The eight chromatic tiles comprising brilliant red, yellow, and orange colour shades as well as saturated green, blue, and violet colour shades are useful in testing for wavelength errors. These chromatic colours exhibit steep slopes at various spectral ranges and serve to detect spectral shifts in the instrument's wavelength scale. Readings of these tiles provide the basis for determining the extent of instrumental problems and serve as reference point to which the instrument can be adjusted at each scheduled preventive-maintenance service call (at least every six months). As an instrument approaches the time for a preventive action, the colour difference calculated from the check-tile measurement begins to increase. On occasion, an increase in the check-tile's readings may result in the preventive maintenance to be performed ahead of schedule.

In case of modern goniospectrophotometers three different instrument scales have to be maintained and validated: the photometric scale, the wavelength scale, and the angle scale. Only the former two photometric and wavelength scales can be tested and adjusted by means of an appropriate set of solid colour standards, while a performance test of the latter angle scale requires gonioapparent reflectance standards. So far only solid colour standards as the set of BCRA ceramic tiles are commercially available and are widely used in industrial applications for validating the performance of colour measurement instruments. Since there is no accepted means in industry for checking the performance of the angle scale of goniospectrophotometers, any user of such colour measurement equipment has to design and produce his own proprietary masstones for performance testing. Typically masstones of brilliant aluminium pigments exhibiting an extreme lightness travel are a good choice for the described purpose, since in addition to the high lightness flop the colour position of such paint formulations is almost free of thermochromism. A lightness drop of $\Delta L^* \approx 180$ units can easily be achieved for bright metallic colours between both viewing angles $\epsilon=15°$ and $\epsilon=45°$, thus giving rise to a sensitivity of the order of $\Delta L^*/\Delta\epsilon \approx 6$/deg.

Special accessories are offered by instrument manufacturers or designed and build by users for standardised measurement of product samples. Such instrument holders allow the user to always position the goniospectrophotometer at the same spot at the sample surface and to fix and hold the instrument at the measurement position by exerting a certain amount of pressure on the top face of the instrument ensuring a close contact between sample surface and measurement head. Compared to a purely manual operation the variance of the measurement results can be significantly reduced when utilising such equipment. However, if instruments are integrated into robotic systems for contactless measurement of objects, slight mechanical instabilities or malfunctions may affect the orientation of the measurement plane and have an unintentional impact on the angle scale. Early recognition of geometrical malfunctioning by means of a suitable performance test would help to avoid downtime, time-consuming and costly complaints, and waste material.

Besides black and white calibration tiles, instrument manufacturers frequently also supply a special check-tile with the instrument which can be used routinely for validating the performance of colour measurement instruments and correctness of colour measurement results. In general such tiles are formulated solid green or cyan colour shades and as such can only be utilised for testing the photometric and wavelength scales.

Stability of standards is a highly desired property, since they have to keep their measurement values over a long period of time (perhaps many years). Stability to environmental parameters other than time is likewise important. Standards should be stable to temperature, humidity, and light. This can not always be ensured. For instance brilliant red and yellow pigments are known to be extremely thermochromic. Such standards must be used at the temperature at which they are calibrated, and care must be taken that they do not change temperature due to absorption of energy while being measured. Other materials can be photochromic or hygrochromic.

In order to reduce the dependence of measurement values on position, uniformity of colour (reflected or transmitted) over the entire surface of the standard is important. This requirement can be extended to the lack of azimuth-dependence (orientation of the standard) and to independence of the state of polarisation of the incident light field. Considerations of uniformity also apply to the surface topography of standards.

Generally they should be flat and highly polished, although in practice both ceramic tiles and porcelain enamels exhibit a slight surface pattern known as orange peel.

When analysing the reflectance properties of opaque gonioapparent coatings, for example, of colour- and/or effect-imparting base-coats as used in automotive coatings the reflectance level of high-angle readings is very low and the corresponding colour appears desaturated (less chromatic) and dark. Opaque gonioapparent colour shades can therefore only serve to validate the angle scale of a goniospectrophotometer. For a test of the other two photometric and wavelength scales further independent reflectance standards are required.

Therefore, there is still a need for a check-tile allowing a simultaneous quick check of all three instrument scales of colour measurement instruments such as goniospectrophotometers.

SUMMARY OF THE INVENTION

The objective of the present invention is to provide a check-tile allowing a simultaneous quick check of all three instrument scales, photometric scale, wavelength scale, angle scale) of colour measurement instruments such as goniospectrophotometers. Such a check-tile shall quickly validate the performance of a colour measurement instrument, i.e. a single reflectance standard of sufficient sensitivity for changes in all three instrument scales is needed. Furthermore, the following properties are also desirable for the check-tile: stability, uniformity, durability, non-fluorescence, opacity, easy to clean and easy to handle.

The present invention relates to a check-tile for validating instrument scales of colour measurement instruments, in particular of goniospectrophotometers, said check-tile comprising a non-transparent (opaque) coloured substrate coated with a pigmented coating, wherein A) said non-transparent (opaque) coloured substrate is coloured with at least one achromatic solid pigment, and is coated with a pigmented mid-coat, wherein said pigmented mid-coat is translucent and made of a base coat coating composition I comprising at least one transparent interference pigment and at least one transparent or semi-transparent solid coloured pigment, or B) said non-transparent (opaque) coloured substrate is coloured with at least one opaque solid coloured pigment, and is coated with a pigmented mid-coat, wherein said pigmented mid-coat is translucent and made of a base coat coating composition II comprising at least one transparent interference pigment.

DETAILED DESCRIPTION

Figure 1:
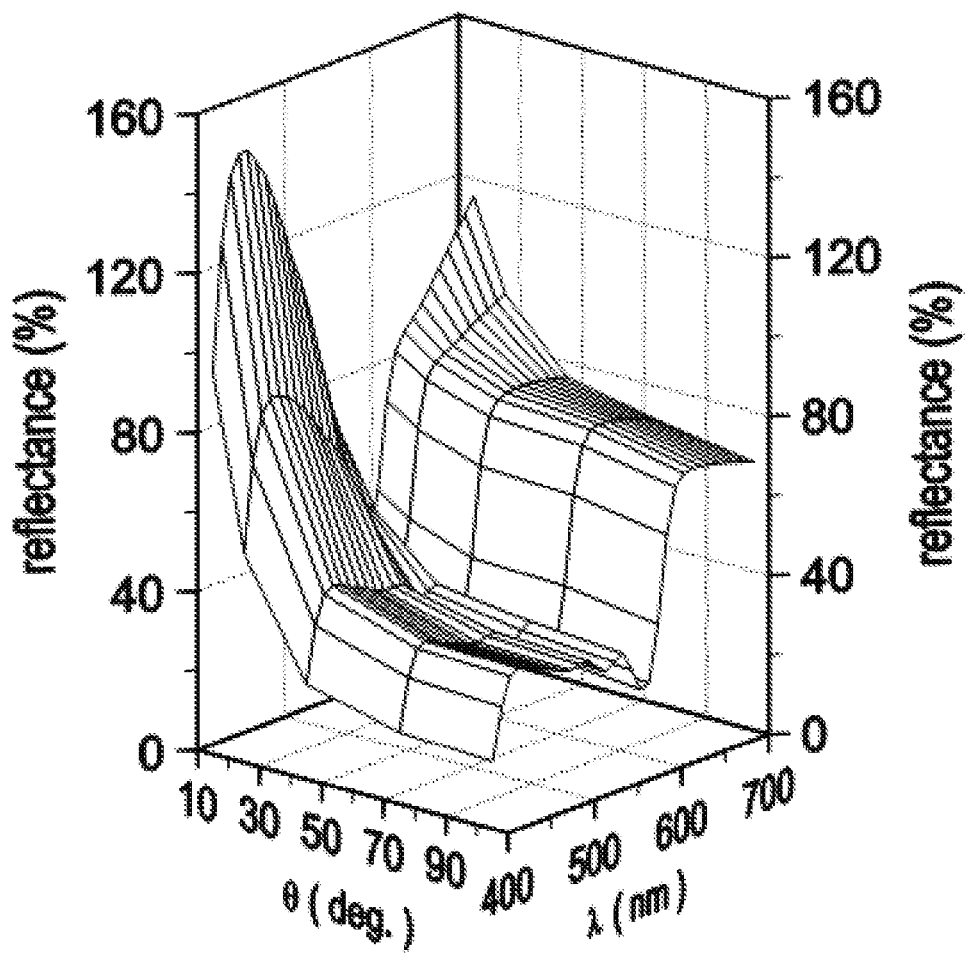
FIG. 1 shows an example of a reflectance surface of a check-tile according to alternative A) of the invention (coloured with an achromatic solid pigment, coated with a mid-coat I and a clear coat) exhibiting an extreme two-tone colour travel from blue to red. The figure displays the reflectance as a function of wavelength ($\lambda$) and viewing angle ($\theta$).
Figure 2:
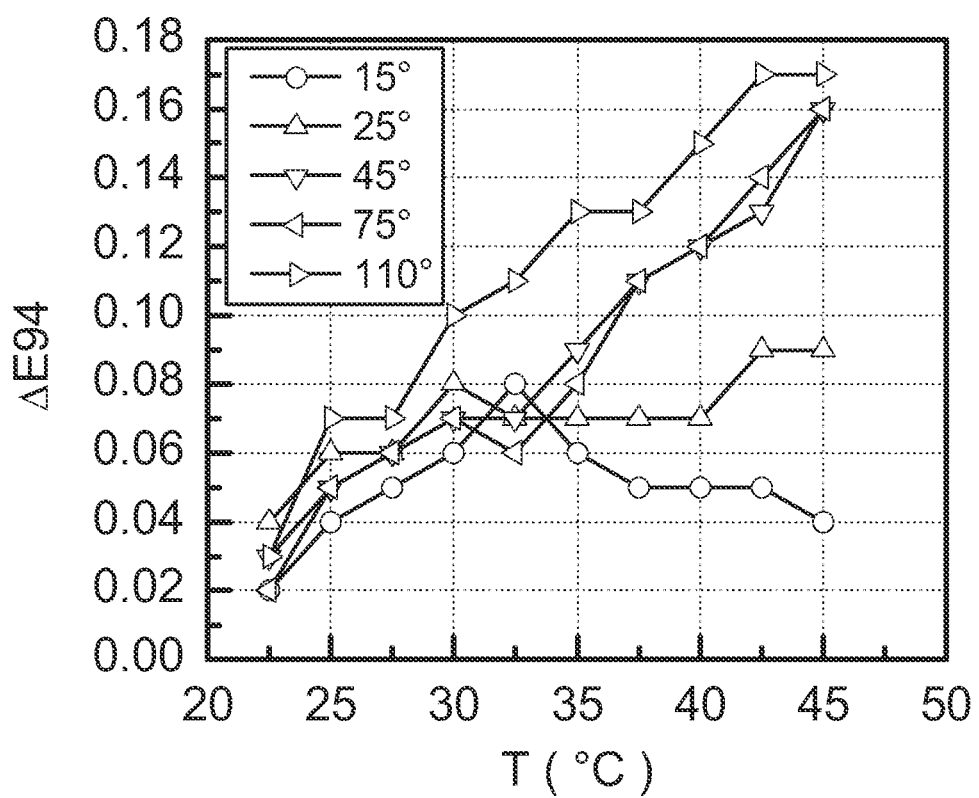
FIG. 2 shows the temperature variation of the colour position of the coated substrate displayed in FIG. 1. The graph displays the residual colour difference $\Delta E94$ of the respective sample colour at temperature T with respect to the starting colour position at room temperature.

These and other features and advantages of the present invention will be more readily understood, by those of ordinary skill in the art, from a reading of the following detailed description. It is to be appreciated those certain feature of the invention, which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise.

As used herein:

The term "colour measurement instrument" shall mean here and in the following a device to detect light reflected by a target and to disperse the spectrum in its components within the desired range of wavelengths, preferably within the visible spectral range.

The term "goniospectrophotometer" shall mean here and in the following a colour measurement instrument, where the illumination/viewing geometry is selectable, allowing the user to create multiple combinations of angles of light incidence and viewing of reflected light. Three different concepts have been realised in commercially available instruments: (i) fixed angle of illumination and variable angle of viewing, (ii) reciprocal convention of variable angle of illumination and fixed angle of viewing, and (iii) variable angle of illumination and variable angle of viewing. A typical set of measurement geometries consists of a fixed illumination angle of $\alpha=45°$ with respect to the sample surface normal and five viewing angles at $\epsilon=15°$, $25°$, $45°$, $75°$, and $110°$ with respect to the specular angle (see FIG. 1). Goniospectrophotometers are ideal for measurement and analysis of gonioapparent material such as metallic or pearlescent paints and interference pigments.

The term "check-tile" shall mean here and in the following a device qualified to validate the performance of a colour measurement instrument and the correctness of all instrument scales. To fulfil the requirements for a quick test of all instrument scales (photometric, wavelength, and angle scales) such a check-tile has to possess suitable spectral features.

The terms "transparent", "translucent" and "opaque" shall mean the following:

When light passes through a medium it may become continuously attenuated. If attenuation is complete and no light is transmitted, the medium is called opaque (or non-transparent). If light passes through a medium without any attenuation, it is termed transparent, while a body with partial attenuation is called semi-transparent. A medium that allows a fraction of light to pass through, while scattering the transmitted light into many different directions is called translucent. Whether a medium is transparent, semi-transparent, translucent, or opaque depends on the material as well as on its geometrical thickness.

Transparent solid pigments: Usually the transparency of a pigmented system denotes its ability to scatter light as little as possible. Examples of transparent pigments are, e.g., organic carbon black pigments (P.B1.7). There is a plethora of transparent organic blue, yellow, and red pigments available on the market as, e.g., P.B.15:1, P.Y.110, and P.R.202.

Opaque solid pigments: The majority of inorganic solid pigments belongs to the class of opaque or well-hiding pigments. A typical example is the standard $TiO_2$ white pigment (P.W.6), whose size is adjusted to attain the maximum scattering power, or iron-oxide yellow (P.Y.42) or red pigments (P.R.101) or cobalt blue pigments (P.B.28).

Semi-transparent solid pigments: A limited number of pigments just falls between the above two extreme categories and are termed semi-transparent. Typical representatives are diketo-pyrrolo-pyrrole red pigments (P.R.254), yellow azopigments (P.Y.151), or the micronised variant of $TiO_2$ called µ-$TiO_2$ (P.W.6).

Achromatic solid pigments: Achromatic pigments or colours are located in the close proximity of the lightness axis (L*) of the colour space. A realistic and acceptable limit can be defined by chroma values $C^*<10$ units or $C^*<18$ and $L^*>27$ units (DIN6175 part 2). An example for an achromatic solid pigment is a white pigment as, for example, titan dioxide.

The term "solid pigment" shall mean here and in the following an inorganic or organic substance consisting of small particles which are practically insoluble in the applied medium and used owing to their colouring, protective, or electromagnetic properties. Solid pigments can be characterised by their chemical composition and their optical and technical properties. Their optical properties are determined by their light scattering and absorbing properties which can be selective (chromatic or coloured pigments) or aselective (achromatic pigments).

The term "effect pigment" shall mean here and in the following generally platelet-like pigment particles which besides colour imparting a substrate additional optical properties as angle-dependent colour and lightness travel and visual texture. The pigment particles themselves are practically insoluble substances utilised as colorant. The palette of effect pigments is diverse and can be divided into interference and mirror-like reflective pigments. In order to fully exploit their colouristic potential a parallel alignment of the pigment particles to the surface of the embedding medium should be achieved.

The term "interference pigment" shall mean here and in the following a class of pigments whose colour is generated completely or predominantly by the phenomenon of interference of light. Such pigments contain a transparent lamellar or platelet-like core (as, e.g., natural mica or synthetic $SiO_2$) coated with a high refractive index metal oxide (as, e.g., $TiO_2$ or $Fe_2O_3$).

The term "gonioapparent reflectance standard" or "gonioapparent coating" or "gonioapparent colour shade" shall mean here and in the following a reflectance standard, colour shade and coating with the optical property of anisotropic reflecting a beam of collimated incident light. If, e.g., such a colour shade is illuminated by a collimated beam of light at a constant angle, the level of the reflected light and with it the colour will be strongly dependent on the viewing angle. Such colour shades can be formulated by means of special effect pigments as, e.g., interference pigments.

Figure 5:
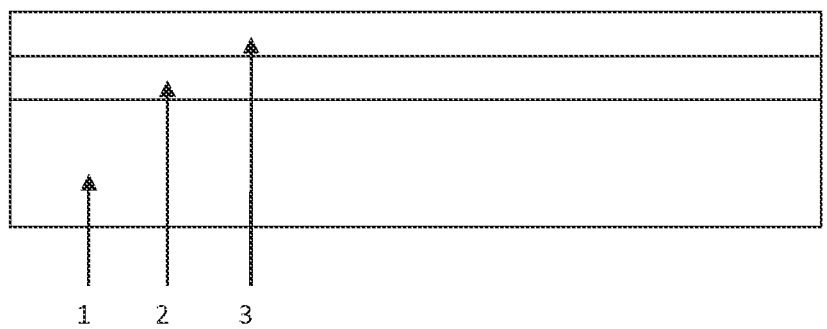
FIG. 5 shows a cross sectional view of a section of an exemplary check-tile comprising a non-transparent (opaque) coloured substrate coated with a pigmented coating according to an embodiment described herein.

The check-tile of the present invention fulfils the optical profile for testing all three instrument scales of colour measurement instruments. With reference to FIG. 5, the check-tile comprises a non-transparent coloured substrate 1 coloured (or pigmented) with a specific type of pigments and coated with a coating 2 of specific pigmentation.

According to alternative (A) said non-transparent (opaque) coloured substrate 1 is coloured or pigmented with at least one achromatic solid pigment and is coated with a pigmented mid-coat I 2, wherein said pigmented mid-coat 2 is translucent and made of a base coat coating composition I, comprising at least one transparent interference pigment and at least one transparent or semi-transparent solid colour pigment.

According to alternative (B) said non-transparent (opaque) coloured substrate 1 is coloured or pigmented with at least one opaque solid coloured pigment, and is coated with a pigmented mid-coat II 2, wherein said pigmented mid-coat 2 is translucent and made of a base coat coating composition II, comprising at least one transparent interference pigment.

A coloured or pigmented substrate is a substrate that itself contains a pigmentation which causes the colour appearance of the substrate. Examples of coloured substrates are mass pigmented plastic substrates.

The pigmented mid-coat 2 is applied to the coloured or pigmented substrate 1. Preferably the coating additionally comprises a clear top coat 3 on top of the pigmented mid-coat 2, said clear top coat 3 is transparent and made of a clear coat coating composition. More preferred the coating consists of the pigmented mid-coat I or II 2 applied to the coloured substrate 1 and made of the base coat coating composition I or II and the transparent clear top coat 3 applied to the pigmented mid-coat I or II 2 and made of the clear coat coating composition.

Coloured or pigmented substrates that can be used include a variety of substrates such as, for example, pigmented and mass pigmented plastic substrates, pigmented and synthetic stone materials, pigmented foils or films, ceramics or enamel substrates. Useful plastic material include polyester reinforced fibreglass, reactioninjection molded urethanes, partially crystalline polyamides, and the like or mixtures thereof. The plastic material can be bass pigmented by adding the pigments to the initial plastic composition and extruding or molding the plastic composition in order to form the final pigmented plastic substrate. Examples of pigmented synthetic stone material are those comprising a polymer matrix filed with at least one filler. The polymer matrix can be an acrylic, methacrylic or polyester based matrix. Particular examples of synthetic stone are those comprising a polymethylmethacrylat resin matrix filled with aluminum trihydrate filler, optionally in combination with other fillers. Pigmented synthetic stone materials are sold, for example under the trade name Corian® by DuPont. Pigmented foils and films to be used as pigmented substrate can be any type of foil or film as long as they are opaque pigmented materials, which can be over-coated and have sufficient stiffness.

Alternative A)

According to alternative (A) the substrate is pigmented with at least on e achromatic solid pigment. Preferably the substrate is free of effect pigments. In particular the substrate does not contain opaque solid coloured pigments. More preferred the substrate does not contain pigments other than the at least one achromatic solid pigment.

Achromatic solid pigments are, for example, grey and white solid pigments. The most preferred achromatic solid pigment is titanium dioxide or a mixture of titanium dioxide pigments. The titanium dioxide pigments can be surface treated. Suitable solid pigments are commercially available.

The mid-coat I is translucent and made of base coating composition I. Base coat coating composition I comprises at least one transparent interference pigment and at least one transparent or semi-transparent solid pigment. Preferably base coat coating composition I does not contain opaque solid coloured pigments. Examples of transparent interference pigments are those as defined above.

In order to get highly satured colours, complex pigment mixtures should be avoided in general when formulating the base coat coating composition I. Binary mixtures of a transparent interference pigment and a transparent or semi-transparent solid colour pigment are preferred in order to retain the prominent optical properties of both ingredients.

Preferred transparent interference pigments are those which do have sufficient transparency in general and high reflectivity and high chroma close to the specular angle. The design of typical useful interference pigments is based on a transparent platelet-like core (as, e.g., natural mica or artificially produced $SiO_2$ flakes) covered by a thin layer of a metal-oxide, preferably of titanium dioxide ($TiO_2$). Hence such interference pigments can consist of three layers with different refractive indices and four interfaces. In particular the types having a $TiO_2$ layer are sufficiently transparent, since they do not absorb light in the visible spectral range and only may produce high-chroma colour by interference. Therefore interference pigments having a transparent platelet-like core coated with a layer of titanium dioxide ($TiO_2$) are preferred.

The thickness of the $TiO_2$ layer determines the interference colour. With increasing film thickness of the $TiO_2$ coating interference colours develop varying from gold, red, and blue to green. All of these interference pigments can be used as prime colour in the near-specular range and combined with appropriate transparent or semi-transparent solid pigments. Preferably pure interference colours are chosen to create spectra of high chroma and steep slopes. The amount of transparent or semi-transparent solid pigment added to the formulation of the base coat coating composition I has to be kept sufficiently low so that the lightness level of the interference pigment at the near-specular angle is almost retained. Amounts of, for example, 0.005 to 0.05% by weight, based on the entire amount of the composition, can be added. The overall solids content of the mid-coat composition may range, for example from about 8 to 30% by weight, in particular 10 to 25% by weight. The specific pigment to binder ratio can vary widely as long as it provides the requisite colour and colour travel. The pigment to binder ratio can be, for example, in the range of 5 to 20, in particular of 5 to 15. Pigment to binder ratio means the amount of pigments in the composition divided trough the amount of binder in the composition, multiplied with 100. A person skilled in the art is able to select the appropriate amounts of pigments and a suitable pigment to binder ratio.

Alternative B)

According to alternative (B) the substrate is pigmented with at least one opaque solid coloured pigment. Preferably the substrate is free of effect pigments. Opaque solid coloured pigments are, for example, iron-oxide yellow (P.Y.42), orange pigments or red pigments (P.R.101) or cobalt blue pigments (P.B.28). Suitable solid coloured pigments are commercially available.

The mid-coat II is translucent and made of base coat coating composition II. Base coat coating composition II is free of other pigments contributing to the colour of the mid-coat, i.e. is, for example, free of transparent solid colour pigments and opaque solid colour pigments. Examples of transparent interference pigments are those having a transparent core coated with titanium dioxide.

To design the desired colour appearance and colour travel of the check-tile a translucent mid-coat II layer containing only the transparent interference pigment or a mixture of transparent interference pigments is used in combination with the coloured background (coloured substrate) pigmented with the opaque solid colour pigment or a complex mixture of opaque solid colour pigments. The background colour (colour of the substrate) should have a sufficiently high chroma, which can preferably be realised with masstones of red, orange, or yellow solid colour pigments or complex mixtures of less brilliant pigments (masstones as, e.g., blue solid pigments) with a white pigment.

Therefore the substrate is preferably pigmented with only a single solid colour pigment of high chroma and brightness, or a complex pigment mixture of high chroma and brightness. The mid-coat II is formulated as a special effect coat containing only a single transparent interference pigment or a mixture of transparent interference pigments. The transparent interference pigment or the mixture of transparent interference pigments should be present in sufficient dilution. The dilution must not be too high as to preserve the high reflectivity of the mid-coat close to the specular angle. The necessary dilution can be achieved by varying the film thickness of the mid-coat or by varying the pigment-binder ratio in the base coat coating composition II. The overall solids content of the mid-coat composition can range, for example from 10 to 30% by weight, in particular from 15 to 25% by weight. The specific pigment to binder ratio can vary widely as long as it provides the requisite colour and colour travel. The pigment to binder ratio can be in a range of, for example, 5 to 20, in particular 5 to 15. Pigment to binder ratio means the amount of pigments in the composition divided through the amount of binder in the composition, multiplied with 100. A person skilled in the art is able to select the appropriate amounts of pigments and a suitable pigment to binder ratio.

The base coat coating compositions I and II further comprise the conventional constituents of a pigmented base coat coating composition as used, for example, in automotive coatings. They can comprise one or more binders, and optionally at least one of the following constituents: cross-linking agents, conventional coating additives, water and organic solvents.

Examples of binders are conventional film-forming binders for preparing water-based or organic solvent based base coat coating compositions and familiar to the person skilled in the art. Examples are polyester resins, (meth)acrylic copolymer resins or polyester/(meth)acrylic copolymer hybrids and polyurethane resins or polyurethane/(meth)acrylic copolymer hybrids. These may be functional or non-functional resins. In order to ensure sufficient water dilutability of the binders in case of water-based coating compositions, these binders are modified in a suitable manner to render them hydrophilic. The binders may be ionically (anionically and/or cationically) and/or non-ionically modified. An anionic modification and an anionic modification in combination with a non-ionic modification is preferred. Preferably water-dilutable binders may contain carboxylic acid groups, sulfonic and/or phosphonic acid groups. Carboxylic acid groups are most preferred. Also, emulsifiers can be used, alone or in addition to a hydrophilic modification of the binders A).

Preferably the base coat coating compositions comprise polyurethane resins, optionally in combination with other resins, e.g. (meth)acrylic copolymers, and with dispersants. Examples of polyurethane resins are those, for example, with a number average molecular weight Mn of 500 to 500 000 g/mol, preferably, of 1100 to 300 000 g/mol, most preferably, of 5000 to 300 000 g/mol, an acid value of 10 to 100 mg KOH/g, preferably of 20 to 80 mg KOH/g. Appropriate polyurethane resins which may be used are, for example, prepared by reacting compounds which are reactive with respect to isocyanate groups and polyisocyanates having at least 2 free isocyanate groups per molecule. The thus obtained polyurethane resins can still be subjected to chain extension to increase the molecular weight. For example, NCO-functional polyurethane prepolymers can be reacted with compounds, which are reactive with respect to isocyanate groups. Compounds, which are reactive with respect to isocyanate groups, are in particular compounds with hydroxyl and/or secondary and/or primary amino groups. OH-functional polyurethane prepolymers can be chain extended for example with polyisocyanates. Other preferred binders are acrylic or methacrylic copolymers.

The base coat coating compositions I and II may be physically drying or chemically cross-linking. Accordingly, the base coat coating compositions can contain cross-linking agents, such as, for example, polyisocyanates with free isocyanate groups. Selection of the optionally used cross-linking agents depends on the type of cross-linkable groups in the binders and is familiar to the person skilled in the art.

The base coat coating compositions I and II may contain conventional coating additives in conventional quantities, for example, of 0.1 to 5 wt. %, relative to the solids content of the base coat coating compositions. Examples of additives are neutralizing agents, antifoaming agents, wetting agents, adhesion promoters, catalysts, levelling agents, anticratering agents, thickeners, rheology control agents, e.g. layered silicates and light stabilizers.

The base coat coating compositions I and II are liquid coating compositions comprising the pigments, binders, optionally cross-linking agents and a liquid carrier. The liquid carrier can be an organic solvent, a mixture of organic solvents and/or water. Therefore, the base coat coating composition can be organic solvent-based or water-based.

Organic solvent-based base coat coating compositions are coating compositions, wherein organic solvents are used as solvent or thinner when preparing and/or applying the coating composition. The organic solvent-based coating compositions can contain about 20 to 80% by weight of organic solvents, based on the total amount of the coating composition.

Water-based base coat coating compositions are coating compositions, wherein water is used as solvent or thinner when preparing and/or applying the coating composition. The water-based coating compositions can contain about 20 to 80% by weight of water, based on the total amount of the coating composition and optionally, up to 15% by weight, preferably, below 10% by weight of organic solvents, based on the total amount of the coating composition.

Referring again to FIG. 5, preferably the coating applied to the non-transparent coloured substrate 1 further comprises a clear top coat 3 applied to the pigmented mid-coat 2, wherein said clear top coat 3 is transparent and made of a clear coat coating composition. The clear coat coating composition is also a liquid coating composition comprising binders, optionally cross-linking agents and a liquid carrier. The liquid carrier can be an organic solvent, a mixture of organic solvents and/or water. Therefore, the clear coat coating compositions can be organic solvent-based or water-based. The clear coat coating composition can contain conventional coating additives in conventional quantities, for example, of 0.1 to 5 wt. %, relative to the solids content thereof. Examples of additives are those as mentioned above for the base coat coating compositions. Preferably the clear coat coating composition comprises at least one hydroxyl-functional binder and a polyisocyanate cross-linker.

Due to the translucent mid-coat layer the optical properties of the background (coloured substrate) contribute to the total colour appearance of the check-tile. Colour shades with an extreme colour travel with viewing angle and a comparably highly saturated colour at the flat and high angles can be designed. The outer clear top coat layer can be formed by an un-pigmented or colourless transparent clear coat coating composition conveying a glossy appearance and serving as a protective layer.

With reference to FIG. 5, the application of the coating layers can be performed as follows:

Base coat coating composition I and II each can be applied to the coloured or pigmented substrate 1 thereby forming the mid-coat 2 on the substrate 1. The base coat coating compositions I and II can be applied each in a resulting dry film thickness of, for example, 15-30 μm. Following a flash-off period, if allowed for, the coating layers 2 can be hardened or dried. Hardening or drying can take place, for example, at 30 to 80° C. for 15 to 45 minutes.

Preferably a transparent top coat layer 3 can be applied on the mid coat 2. The transparent top coat layer 3 can be applied by using the wet-on-wet process. Following a flash-off period, if allowed for, ground coat, mid coat 2 and clear coat layers 3 can be hardened or dried together. Hardening or drying can take place, for example, at 30 to 80° C. for 15 to 45 minutes. However, it is also possible to harden or dry one or more of the three layers separately, optionally after a flash-off period.

The coating compositions described above can be applied by conventional techniques, preferably by spraying.

The present invention also relates to the use of the afore described check-tiles for validating instrument scales, in particular the photometric scale, the wavelength scale, and the angle scale, of colour measurement instruments, or with other words relates to the use of said check-tiles for testing the performance of colour measurement instruments.

Before utilising the check-tile of the present invention for testing the performance of a colour measurement instrument, the instrument has to be calibrated thoroughly and thereby forced into a well-defined state. Calibration is considered to be the process by which an instrument is adjusted to read, as closely as possible, the same values as those assigned by a recognized standardisation laboratory. After the calibration process, the instrument performance should be tested by means of the check-tile.

EXAMPLES

FIG. 1 shows the reflectance surface of a check tile according to alternative A) of the present invention. The measurements were made with typical portable goniospectrophotometers equipped with five different measurement geometries. In this particular case the angle of illumination was fixed at an angle 45° with respect to the sample surface normal. The reflected light field was detected at five different viewing angles at 15°, 25°, 45°, 75°, and 110° with respect to the gloss angle.

FIG. 1 displays the reflectance of a coating according to the invention formulated in an organic solvent-based paint quality. The spectra at the high angle are those of a saturated red colour shade. Close to the specular angle the colour of the utilised transparent interference pigment (rutile pearl blue) dominates the reflectance picture.

Details of the base coat coating composition I used to prepare the check-tile are listed below. $TiO_2$-coated interference pigments have been utilised, since they have a higher degree of translucency than $Fe_2O_3$- or $Cr_2O_3$-coated interference pigments or combination pigments. The substrate is pigmented with a white pigment (P.W. 6) and coated with a mid-coat formed by base coat coating composition I containing a binary mixture of a rutile pearl blue interference pigment with a red quinacridone pigment (P.R.202). The topcoat layer has been formed by a colourless clear-coat composition (Standocryl® VOC Easy Clear from Standox GmbH).

For formulating base coat coating composition I tints of a typical organic solvent-based Refinish mixing system have been utilised. In order to adjust the required translucency for the mid-coat, the tints for preparing base coat coating composition I have been diluted with binder by a factor of 4. The amount of solid pigment added to the formulation of the mid-coat layer has been kept sufficiently low so that the lightness level of the interference pigment at the near-specular angle is almost retained.

Figure 4:
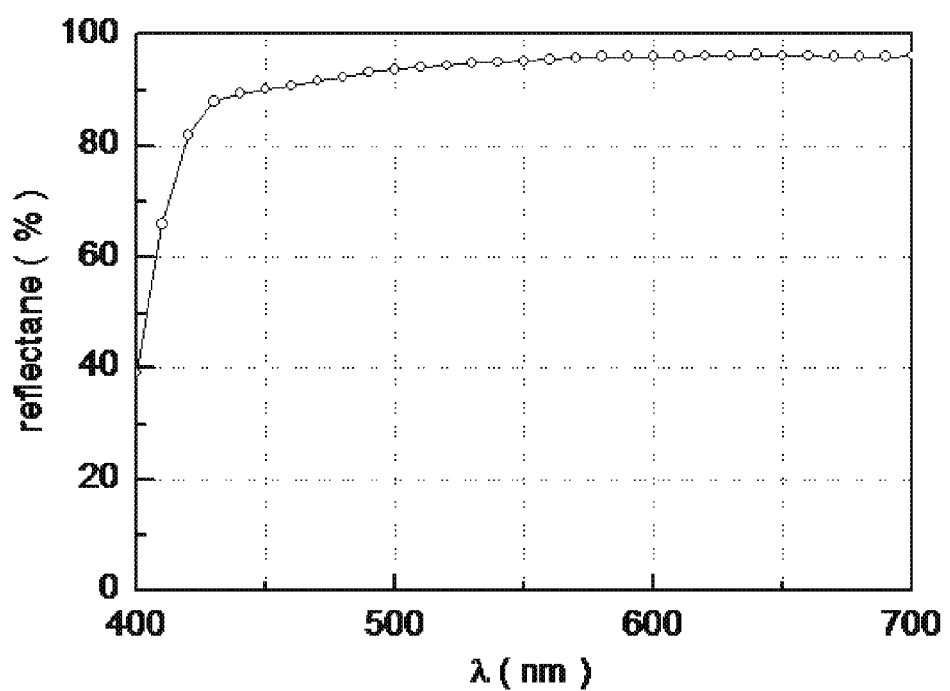
FIG. 4 shows the reflectance of a white pigmented substrate (the background colour).

A white plastic sheet (30×30 cm) has been coated according to the invention with the mid-coat (base coat coating composition I) and the clear coat. FIG. 4 shows the reflectance data of the white plastic sheet.

The mid-coat has been applied in three spray passes in a resulting dry film thickness of about 20 μm. The clear coat has been applied wet-in wet in four spray passes in a resulting dry film thickness of about 40 μm. The coating has been cured at 80° C. for 15 minutes.

Figure 3A:
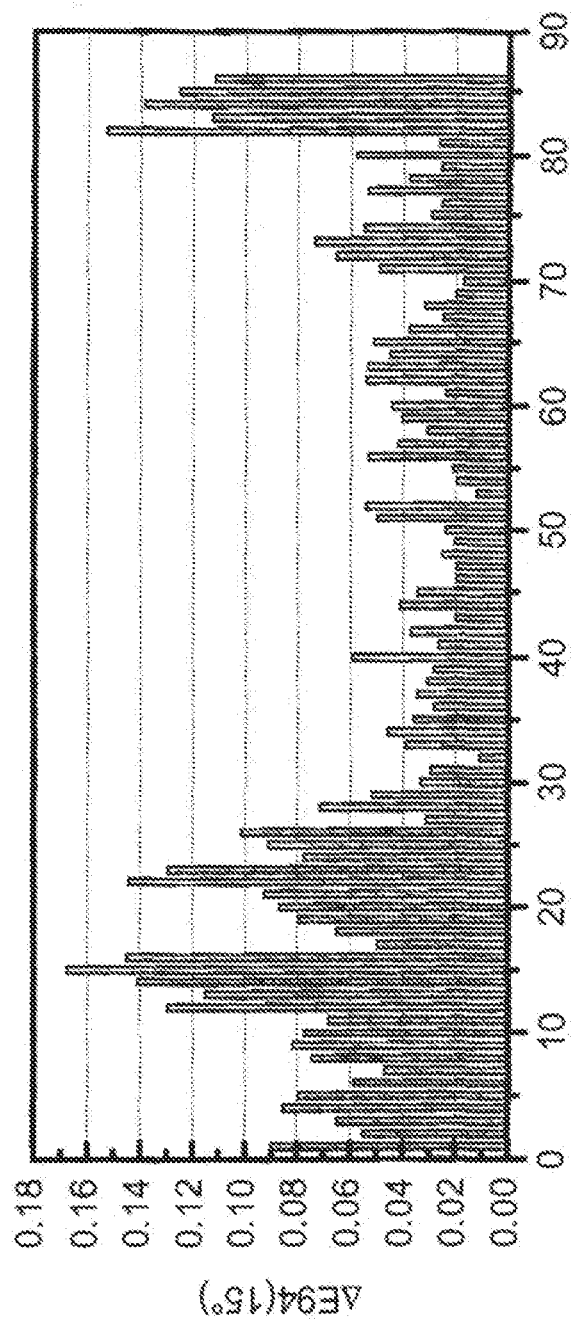
FIGS. 3A to 3C show the check-tile repeatability of the coated substrate displayed in FIG. 1 with blue to red colour travel over a time period of about three month. The residual colour difference $\Delta E94$ at all three viewing angles (15°, 45°, 110°) is taken as quality measure with the overall average serving as reference.
Figure 3B:
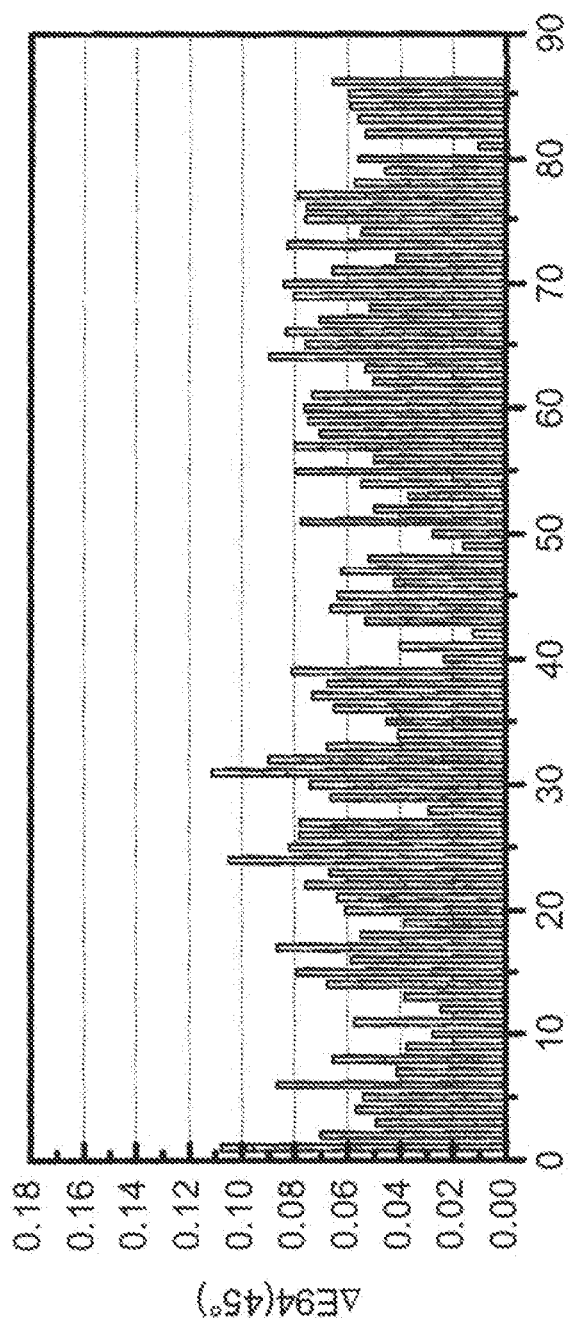
Figure 3C:
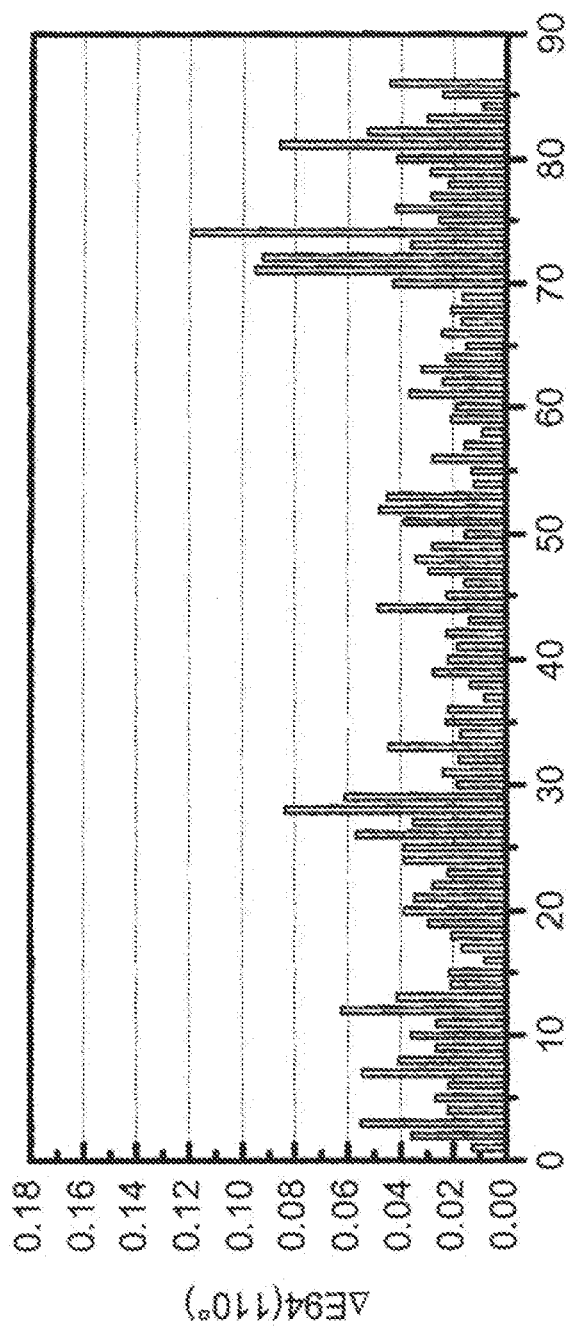

Long-term repeatability data were obtained for several different instruments under industrial production control conditions. FIGS. 3A to 3C show data sets of the blue-red check-tile mounted in a robotic system for contactless measurement operation at three viewing angles (15°, 45°, 110°). The mounting of both instrument and reflectance standard ensures that always the same sample spot is measured by the instrument. In this figure the measured residual colour difference $\Delta E94$ is shown in a time series covering a time period of about three months. The first measurement has been taken as reference for all subsequent measurement. As can be seen from FIGS. 3A to 3C the repeatability of the measurement results has been excellent for a bright gonioapparent colour shade. As expected the highest variance of the data has been obtained for the 15° viewing angle, although the absolute order of magnitude is very small for a saturated special effect colour shade and far below the perception threshold. However, the average $\Delta E94$ for the 15° and 45° viewing angle are about the same: $<\Delta E94(15°)>\approx 0.058$ and $<\Delta E94(55°)>\approx 0.061$. The lower: $<\Delta E94(110°)>\approx 0.032$. The mean value of the colour positions of the data set can be used as a new digital target for all further mearurements. This new centered target colour position allows the definition of tighter tolerances compared to the first measurement of the time series.

Base Coat Coating Composition I:

The following ingredients have been mixed together:
20 g of BC Mix 803 Blue (from Standox GmbH, containing 10% by weight of a rutile blue pearl pigment (Iriodin®9225), based on the entire formulation);
80 g of binder (Acrylic copolymer, 23% by weight solids)
0.5 g of BC Mix 856 Scarlett (from Standox GmbH, containing 4.2% by weight of P.R.202 (Magenta RV 6843), based on the entire formulation)
33 g of Standox® MSB Thinner (Standox GmbH)

The invention claimed is:

1. A check-tile for validating instrument scales of a color measurement instrument, said check-tile comprising a non-transparent colored substrate coated with a pigmented coating, wherein
(A) said non-transparent colored substrate is colored with at least one achromatic solid pigment, and is coated with a pigmented mid-coat I, wherein said pigmented mid-coat I is translucent and made of a base coat coating composition I comprising a binder, at least one transparent interference pigment and at least one transparent or semi-transparent colored solid pigment, wherein at least one reflectance spectra of said check-tile measured within a range of 70° to 115° off the specular is predominated by the color of the at least one transparent or semi-transparent colored solid pigment, and at least one reflectance spectra of said check-tile measured within a range of 10° to 20° off the specular is predominated by the color of said at least one transparent interference pigment, or (B) said non-transparent colored substrate is colored with at least one opaque solid colored pigment, and is coated with a pigmented mid-coat II, wherein said pigmented mid-coat II is translucent and made of a base coat coating composition II comprising a binder and at least one transparent interference pigment, wherein at least one reflectance spectra of said check-tile measured within a range of 70° to 115° off the specular is predominated by the color of the at least one opaque solid colored pigment, and at least one reflectance spectra of said check-tile measured within a range of 10° to 20° off the specular is predominated by the color of said at least one transparent interference pigment;

wherein said check-tile is of a color suitable for measurement by said color measurement instrument according to a photometric scale and a wavelength scale.

2. The check-tile of claim 1, further comprising a clear top coat made of a transparent clear coat coating composition disposed above the pigmented mid-coat I or II.

3. The check-tile of claim 2, wherein the clear coat coating composition comprises a binder and optionally coating additives.

4. The check-tile of claim 2, wherein said clear top coat is disposed above and in contact with the pigmented mid-coat I and/or II.

5. The check-tile of claim 1, wherein said non-transparent colored substrate is free of effect pigments.

6. The check-tile of claim 1, wherein according to (A) said non-transparent colored substrate is free of opaque solid color pigments.

7. The check-tile of claim 1, wherein according to (A) the achromatic solid pigment is a white pigment.

8. The check-tile of claim 7, wherein the white pigment is titanium dioxide.

9. The check-tile of claim 1, wherein the at least one transparent or semi-transparent solid pigment of the base coat coating composition I is a transparent or semi-transparent yellow, red or orange pigment.

10. The check-tile of claim 1, wherein the at least one opaque solid colored pigment is a red, yellow or orange pigment.

11. The check-tile of claim 1, wherein said base coat coating composition I or II is free of other pigments contributing to the color of the pigmented mid-coat I or II.

12. The check-tile of claim 11, wherein the at least one transparent interference pigment of base coat coating composition I or II has a transparent platelet-like core and the platelet-like core is coated with a layer of titanium dioxide.

13. The check-tile of claim 12, wherein the base coat coating compositions I or II further comprise a coating additive.

14. The check-tile of claim 13, wherein the color measurement instrument is a goniospectrophotometer.

15. The check-tile of claim 1, wherein said non-transparent colored substrate is colored with said at least one achromatic solid pigment, and is coated with said pigmented mid-coat I, and wherein the base coat coating composition I does not contain an opaque solid pigment.

16. The check-tile of claim 1, wherein said non-transparent colored substrate is colored with said at least one achromatic solid pigment, and is coated with said pigmented mid-coat I, and wherein the pigments in said pigmented mid-coat I consist of said at least one transparent interference pigment and said at least one transparent or semi-transparent solid pigment.

17. The check-tile of claim 1, wherein said non-transparent colored substrate is colored with said at least one opaque solid colored pigment, and is coated with said pigmented mid-coat II, and wherein the base coat coating composition II does not contain an opaque solid pigment.

18. The check-tile of claim 1, wherein said non-transparent colored substrate is colored with said at least one opaque solid colored pigment, and is coated with said pigmented mid-coat II, and wherein the pigments in said pigmented mid-coat II consist of said at least one transparent interference pigment.

\* \* \* \* \*